(12) United States Patent
Padmanabhan et al.

(10) Patent No.: US 9,763,082 B2
(45) Date of Patent: Sep. 12, 2017

(54) OPTIMIZING SETUP FOR WIRELESS DEVICES

(71) Applicant: Western Digital Technologies, Inc., Irvine, CA (US)

(72) Inventors: Neeresh Padmanabhan, Sunnyvale, CA (US); Jeffrey Yen-Liang Chen, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/936,602

(22) Filed: Nov. 9, 2015

(65) Prior Publication Data

US 2017/0134933 A1    May 11, 2017

(51) Int. Cl.
| | |
|---|---|
| *H04M 3/00* | (2006.01) |
| *H04W 8/22* | (2009.01) |
| *H04W 4/00* | (2009.01) |
| *H04W 48/16* | (2009.01) |
| *H04N 21/485* | (2011.01) |
| *H04N 21/422* | (2011.01) |
| *H04N 21/6547* | (2011.01) |
| *H04N 21/435* | (2011.01) |
| *H04N 21/41* | (2011.01) |
| *H04W 84/12* | (2009.01) |
| *H04W 88/06* | (2009.01) |

(52) U.S. Cl.
CPC .......... *H04W 8/22* (2013.01); *H04N 21/4126* (2013.01); *H04N 21/42202* (2013.01); *H04N 21/435* (2013.01); *H04N 21/485* (2013.01); *H04N 21/6547* (2013.01); *H04W 4/003* (2013.01); *H04W 48/16* (2013.01); *H04W 84/12* (2013.01); *H04W 88/06* (2013.01)

(58) Field of Classification Search
CPC ....... H04W 8/22; H04W 4/003; H04W 48/16; H04W 84/06; H04W 88/06; H04N 21/485; H04N 21/42202; H04N 21/6547; H04N 21/435; H04N 21/4123
USPC ......................................... 455/418, 419, 420
See application file for complete search history.

(56) References Cited

U.S. PATENT DOCUMENTS

| | | | |
|---|---|---|---|
| 6,499,054 | B1 | 12/2002 | Hesselink et al. |
| 6,732,158 | B1 | 5/2004 | Hesselink et al. |
| 7,120,692 | B2 | 10/2006 | Hesselink et al. |
| 7,454,443 | B2 | 11/2008 | Ram et al. |

(Continued)

OTHER PUBLICATIONS

International Application Division of Korean Intellectual Property Office (KIPO) as ISA/KR, International Search Report and Written Opinion dated Feb. 24, 2017 from related PCT Serial No. PCT/US2016/060702, 11 pages.

*Primary Examiner* — Khai M Nguyen

(57) ABSTRACT

A method of on-boarding a wireless electronic device may comprise sending, by the wireless electronic device, a unique identifier over a wireless local area network; receiving a communication from a computing device having selected the unique identifier and seeking to connect to the wireless electronic device; responsive to having received the communication from the computing device, determining a type of the computing device; and redirecting the computing device to a location on a wide area network where an application configured to interface with the wireless electronic device and suitable for the determined type of computing device is available for download to the computing device.

21 Claims, 4 Drawing Sheets

(56) References Cited

U.S. PATENT DOCUMENTS

| | | |
|---|---|---|
| 7,467,187 B2 | 12/2008 | Hesselink et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,788,404 B2 | 8/2010 | Hesselink et al. |
| 7,917,628 B2 | 3/2011 | Hesselink et al. |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,751,493 B2 | 6/2014 | Procopio et al. |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 2005/0144195 A1 | 6/2005 | Hesselink et al. |
| 2005/0144200 A1* | 6/2005 | Hesselink ............ H04L 63/0209 |
| 2012/0036041 A1 | 2/2012 | Hesselink |
| 2012/0159308 A1* | 6/2012 | Tseng .................... G06F 9/4443 715/234 |
| 2013/0007236 A1 | 1/2013 | Besehanic |
| 2013/0124606 A1* | 5/2013 | Carpenter ............... H04L 67/06 709/203 |
| 2013/0167143 A1* | 6/2013 | Yi ....................... G06F 9/44505 717/178 |
| 2013/0212401 A1 | 8/2013 | Lin |
| 2013/0254024 A1* | 9/2013 | Woods .................. G06Q 30/02 705/14.51 |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2013/0282755 A1 | 10/2013 | Procopio et al. |
| 2014/0019958 A1 | 1/2014 | Sherman |
| 2014/0095439 A1 | 4/2014 | Ram |
| 2014/0101728 A1 | 4/2014 | Defrance et al. |
| 2014/0130134 A1* | 5/2014 | Arora .................... G06F 21/629 726/4 |
| 2014/0164909 A1 | 6/2014 | Graff et al. |
| 2014/0169921 A1 | 6/2014 | Carey |
| 2014/0173215 A1 | 6/2014 | Lin et al. |
| 2015/0106846 A1* | 4/2015 | Chen .................. H04N 21/6547 725/37 |
| 2015/0264408 A1* | 9/2015 | Hao ................. H04N 21/25841 725/23 |

* cited by examiner

OPTIMIZING SETUP FOR WIRELESS DEVICES

BACKGROUND

Configuring a new wireless electronic device for first use can be frustrating, as the user attempts to follow often complex instructions on an unfamiliar device. Moreover, many users have little knowledge of wireless networks and may become bewildered or discouraged in attempting to configure a new wireless electronic device to work with their WiFi network and computing or mobile devices. Embodiments aim to improve the user's experience as he or she unboxes a new wireless electronic devices and configures it for use.

DETAILED DESCRIPTION

Figure 1:
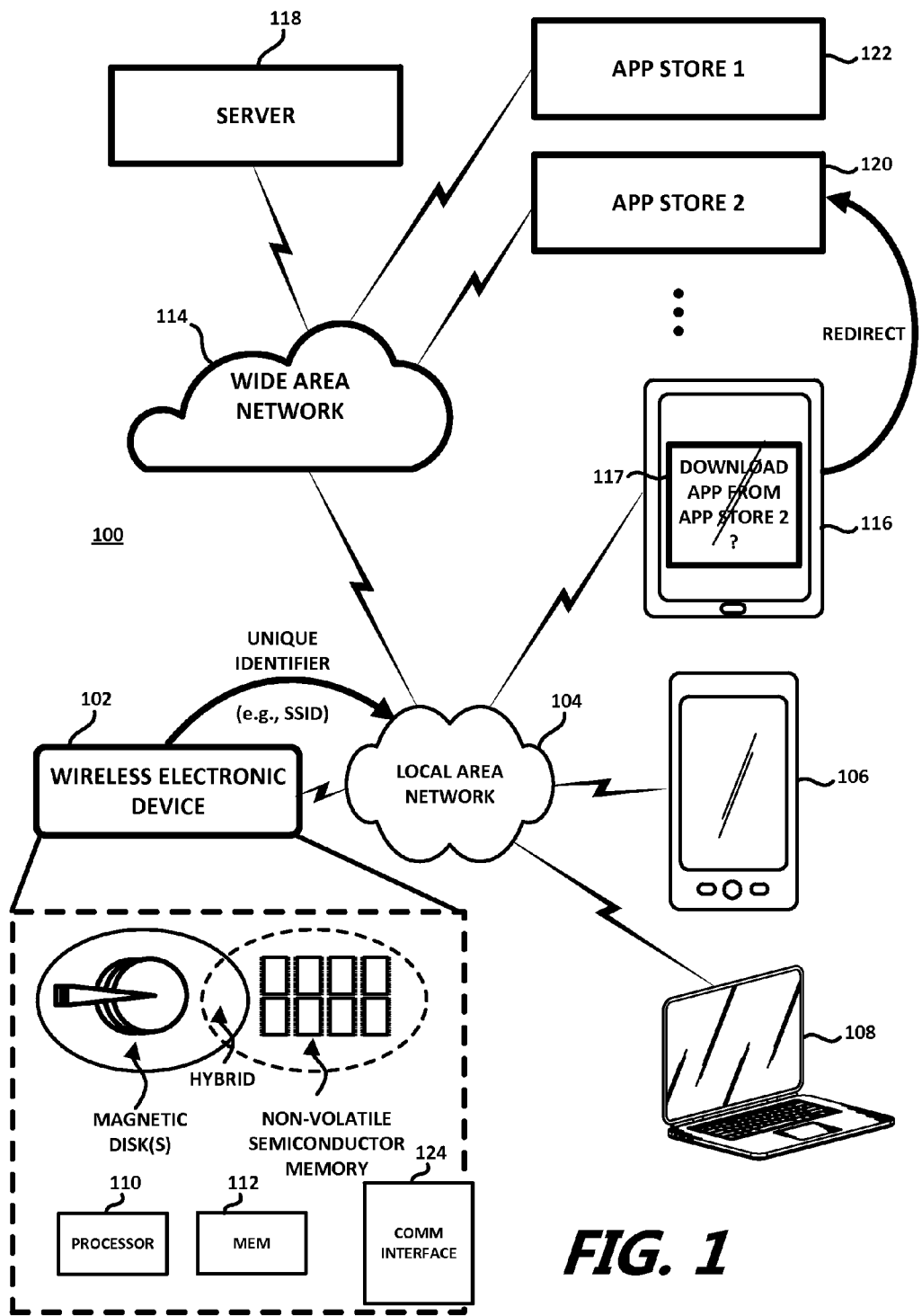
FIG. 1 is a block diagram of a system according to one embodiment.

A system 100, according to one embodiment, may comprise a wireless electronic device 102. In one embodiment, the wireless electronic device 102 may comprise a data storage device that is configured to communicate with a computer network such as, for example, a Local Area Network (LAN) 104 and/or a Wide Area Network (WAN) 114. When the user first purchases the wireless electronic device, unboxes it and first powers it up, it may not be configured to communicate with the user's computing devices and/or with the LAN 104. Moreover, the wireless electronic device 102 may have little or no user interface. That is, the wireless electronic device may not be equipped with a display or other indicators to guide the user to set up or use the device. Indeed, the wireless electronic device 102 may be configured to utilize the user's own computing device or devices for initial setup and later use. In one embodiment, the wireless electronic device 102 may be or comprise a data storage device, which may comprise one or more spinning magnetic disks or may comprise solid state memory such as Flash memory. Alternatively still, the wireless electronic device 102 may be a hybrid device, comprising both spinning magnetic disks and solid state memory. As shown in FIG. 1, the wireless electronic device 102 may comprise one or more processors 110, memory 112 and a communication interface 124, configured to enable the wireless electronic device 102 to communicate with the LAN 104 and/or the WAN 114. In one embodiment, the wireless electronic device may comprise a network attached storage (NAS) device.

Upon being powered up, the wireless electronic device 102 may be configured to broadcast a unique identifier over the LAN 104. For example, the unique identifier may comprise a Service Set Identifier (SSID), which may be configured, for example, as a case sensitive, 32 alphanumeric character unique identifier attached to the header of packets sent over LAN 104 by the wireless electronic device 102. In this manner, the SSID acts as a password when a computing device 106, 108 or 116 (a computer or mobile device, for example) tries to connect to the basic service set (BSS), a component of the IEEE 802.11 architecture. The SSID differentiates one LAN from another, so all access points and all computing devices attempting to connect to a specific LAN must use the same SSID.

FIG. 1 shows several examples of a computing device, at reference numerals 108, 106, 116. Such computing device may be configured as personal computers, such as laptop computer 108, a mobile telephone, as shown at 106 or a tablet computer, as shown at 116, to identify but a few of the possible categories of computing devices. The computing device 108, 106, 116 may be coupled to the wireless LAN 104 and to the WAN 114 and may be configured to receive and select the unique identifier broadcasted by the wireless electronic device 102, for the purpose of entering into communication with the wireless electronic device 102 over the wireless LAN 104.

According to one embodiment, the wireless electronic device 102 may be further configured to receive a communication from a computing device, such as from one of the computing devices 108, 106, 116. For example, the communication received from the computing device (say, computing device 116) may be responsive to the user selecting the unique identifier broadcasted by the wireless electronic device 102 over the LAN 104. For example, the user may have clicked on or otherwise selected the SSID broadcast by wireless electronic device 102 over the LAN 104. According to one embodiment, the communication from the computing device 116 received by the wireless electronic device 102 may enable the wireless electronic device 102 to identify at least the type of device and/or the operating system of the computing device 116. For example, the communication from the computing device 116 received by the wireless electronic device 102 may enable the wireless electronic device 102 to determine whether the computing device 116 is a iOS (Apple, Inc.) device, an Android device or another type (e.g., Samsung) device.

As a result of the identification of the computing device 116 or the type of the computing device 116, the computing device 116 may be caused to be redirected to a location (e.g., a network address) on the WAN 114 where an application (also called an "app") configured to enable the computing device 116 to interface with the wireless electronic device 102 may be available for download. This redirection, in one implementation, may be carried out by the wireless electronic device 102 communicating the determined type of the computing device 116 to a server 118 over the WAN 114. The server 118, thereafter, may send a link (comprising a Universal Resource Locator or URL, for example) to the computing device 116, causing the computing device 116 to go the network address in the received link, which network address may be a location on the WAN 114 where an appropriate application may be available for download by the computing device 116. The application or app at the location on the WAN 104 where the computing device 116 was redirected is an application or app that is suitable for the determined type (e.g., iOS, Android) of the computing device 116. For example, as a result of selecting the unique identifier broadcast by the wireless electronic device 102, the computing device 116 may be automatically (i.e., without further user interaction) redirected to the appropriate App Store 120, 122 (e.g., Apple Store for iOS devices, Android Google Play for Android devices, Amazon Store for Amazon (e.g., Kindle) devices, etc.) Once at the online App Store appropriate for the determined type of device, the computing device 116 may presented with an application configured to enable the computing device 116 to access and use the wireless electronic device 102 to its fullest advantage. According to one embodiment, the downloading and installing of such an application or app from the appropriate Store may be carried out automatically, or may require further user input.

For example, the computing device 116 may be further configured to present, on a user interface of the computing device 116, the application (selected for the determined type of computing device 116) for download from the location (an App Store appropriate for the determined type of the computing device 116) on the WAN 114. For example, the user interface may be or may include a web browser. Thereafter, in response to a download request from the user interface as suggested at 117 in FIG. 1, the application may be downloaded and installed on the computing device 116, to enable the computing device 116, at least when running the downloaded and installed application, to operate the wireless electronic device 102, thereby completing the on-boarding (i.e., configuring for first use) process of the user's wireless electronic device 102.

Figure 2:
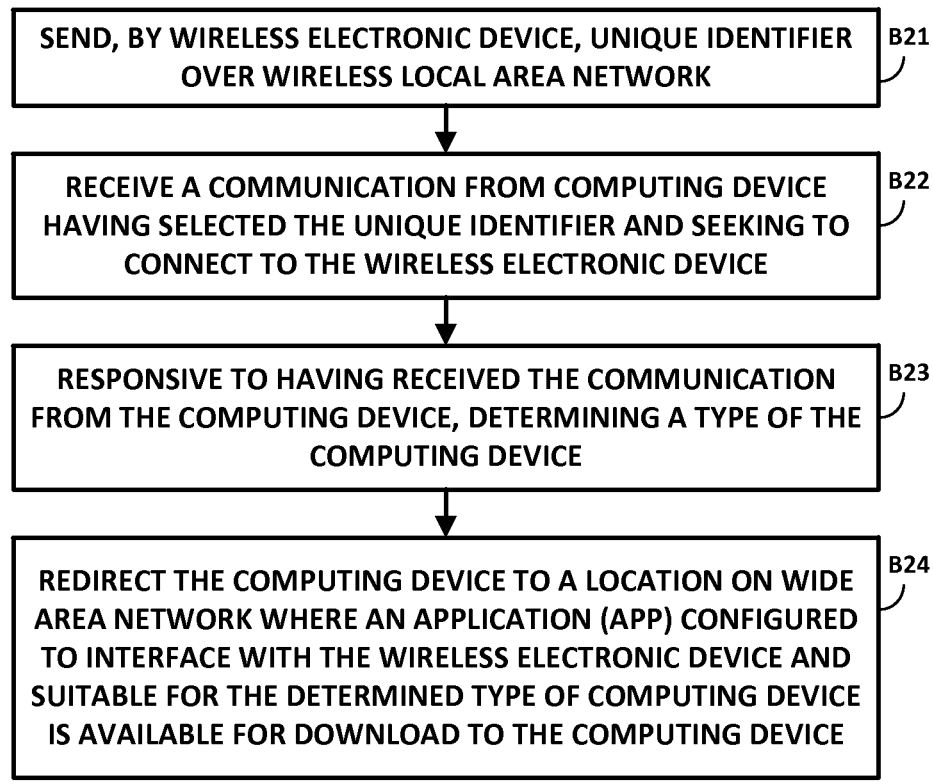
FIG. 2 is a flowchart of a method according to one embodiment.

FIG. 2 is a flowchart of a method of on-boarding a wireless electronic device (such as shown at 102 in FIG. 1), according to one embodiment. As shown therein, block B21 calls for sending, by the wireless electronic device 102, a unique identifier (such as a SSID, for example) over a wireless LAN, such as shown at 104 in FIG. 1. A communication from a computing device, such as one of the computing devices 106, 108 and 116, may then be received. According to one embodiment, such a received communication may evidence that one of the computing devices 106, 108, 116 has received the sent unique identifier, has selected the received unique identifier and is seeking to connect to the wireless electronic device 102 over the LAN 104 and/or the WAN 114, as shown at B22. At B23 in FIG. 2, responsive to having received the communication from the computing device (e.g., computing device 116), the type (e.g., iOS, Android, etc.) of the computing device 116 may be determined as shown at B23. As described relative to FIG. 1, the computing device 116 may be redirected to a location (i.e., a specific address) on the WAN 114 where a selected application is available for download. This selected application, according to one embodiment, may be configured to interface with the wireless electronic device 102, may be suitable for the determined type of computing device and may be available for download to the computing device 116, as shown at B24.

According to one embodiment, the wireless electronic device 102 may also determine a state of the computing device 116. This determined state may include, for example, whether the computing device 116 is in a state in which the computing device 116 has not previously installed the application. If the computing device 116 has indeed already downloaded (or otherwise obtained) the application suitable for its type of device and has already installed such application, such state may be detected or determined. In that case, according to one embodiment, the computing device 116 would not be redirected to an App Store, as such a state would be indicative that the on-boarding process (at least for this combination of wireless electronic device 102 and computing device 116, has already been carried out and that the pair are already configured to communicate and interact with one another. Such on-boarding process, however, may be carried out for other computing devices, such as shown at 106 and 108.

One embodiment enables more functionality than on-boarding. Indeed, the wireless electronic device 102 may be configured to monitor the interactions the user may have therewith, through a computing device 106, 108, 116, and may be further configured to determine which features thereof have been used by the user and which features have not been used or which may be been under-utilized. According to one embodiment, therefore, the wireless electronic device 102 may be configured to message the computing device 106, 108, 116, via the LAN 104 and/or the WAN 114, regarding features of the wireless electronic device 102 that have not been used yet or that may not yet have been used to full advantage. For example, the wireless electronic device may be configured to encrypt the user's data, to post images on a Social Media site or, for example, automatically mirror data on another wireless electronic device or backup site. Yet, the user may not have availed him or herself of these features. In such a case, the wireless electronic device may be configured to notify the user and suggest that these features exist and may be used. For example, the wireless electronic device 102 may be configured to send a message the computing device such as "Did you know? You can easily post these images to your favorite Social Media site. Click here to learn how!"

According to one embodiment, the redirecting of the computing device 106, 108 116 to a selected location on the WAN 114 (a selected App Store, for example) may be implemented using a captive portal on the computing device. In this case, the captive portal may be implemented by intercepting most packets, regardless of address or port, until the user, on computing device 106, 108, 116, for example, attempts to access the wireless electronic device 102. At that time, the browser on the computing device 106, 108, 116 may be redirected to a web page of an App Store appropriate for the determined type of computing device 106, 108, 116, which web page may invite the user to download an app that will enable the user to complete the on-boarding process and make full use of the wireless electronic device 102. In one embodiment, the captive portal is not displayed on a display of the computing device 106, 108, 116 and the use of such a captive portal may be, therefore, wholly transparent to the user.

Figure 3:
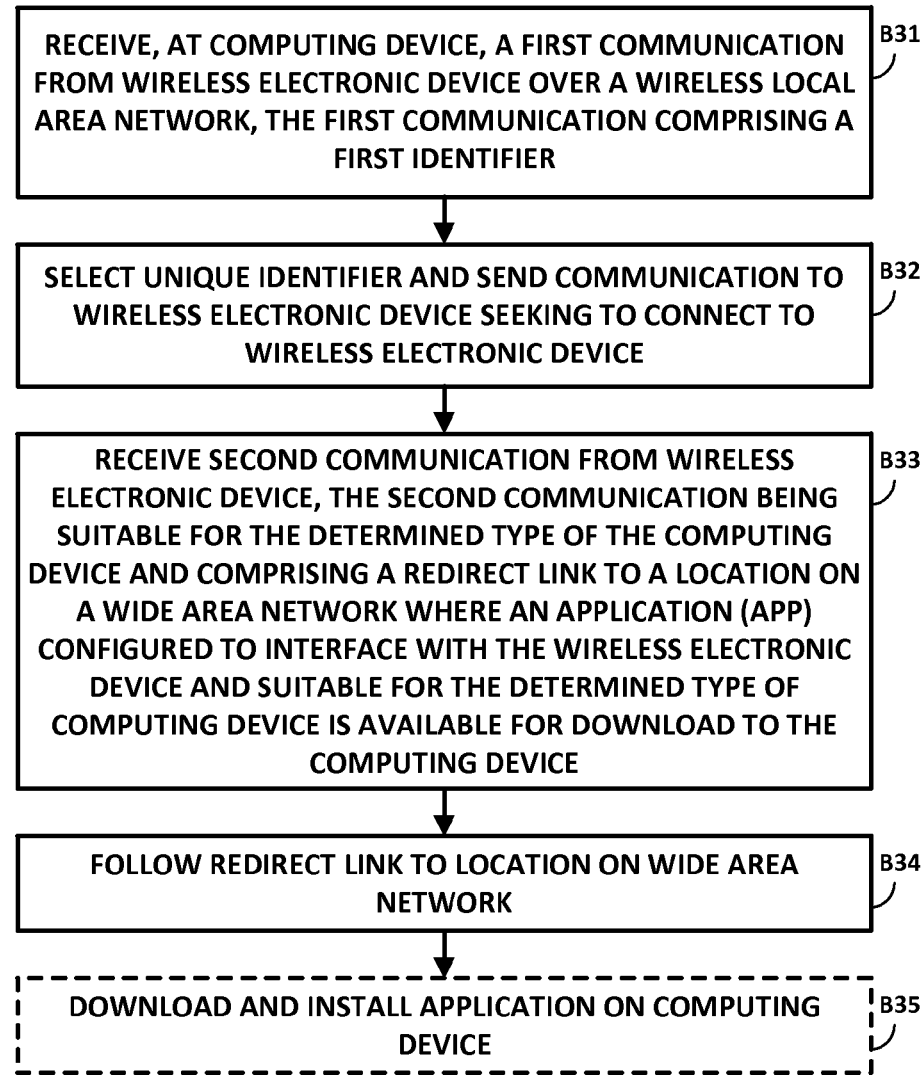
FIG. 3 is a flowchart of a method according to one embodiment.

FIG. 3 is a flowchart of a method for a computing device such as shown at 106, 108 and 116 to on-board a wireless electronic device, according to one embodiment. As shown therein, block B31 calls for receiving, at a computing device 106, 108 or 116, a first communication from a wireless electronic device 102 over a computer network, such as LAN 104 or WAN 114. The first communication, according to one embodiment, may comprise a first identifier such as, for example, a SSID. As shown at B32, the computing device 106, 108 or 116 may then select, through user interaction or programmatically, the received unique identifier and may thereafter send a communication to the wireless electronic device 102 seeking to connect therewith. Block B33 in FIG. 3 calls for the computing device 106, 108 or 116 receiving a second communication from the wireless electronic device 102. This second communication, according to one embodiment, may be suitable for the determined (by the wireless electronic device 102) type of the computing device 106, 108, 116. This second communication may comprise a redirect link to a location on the WAN 114 (which may include the Internet) where an application (an "App") may be available for download to the computing device 106, 108, 116. The App may be configured to interface with the wireless electronic device and may be suitable for the determined type of the computing device 106, 108, 116. That is, the App may be especially configured to run on an iOS device, an Android device, a Samsung device and/or other types of devices. The computing device

106, 108, 116, having received the redirect link, may then follow the redirect link to the location on the WAN 114 encoded in the link as shown at B34, may then download and install the App as shown at B35 and may begin using the wireless electronic device through the App.

Figure 4:
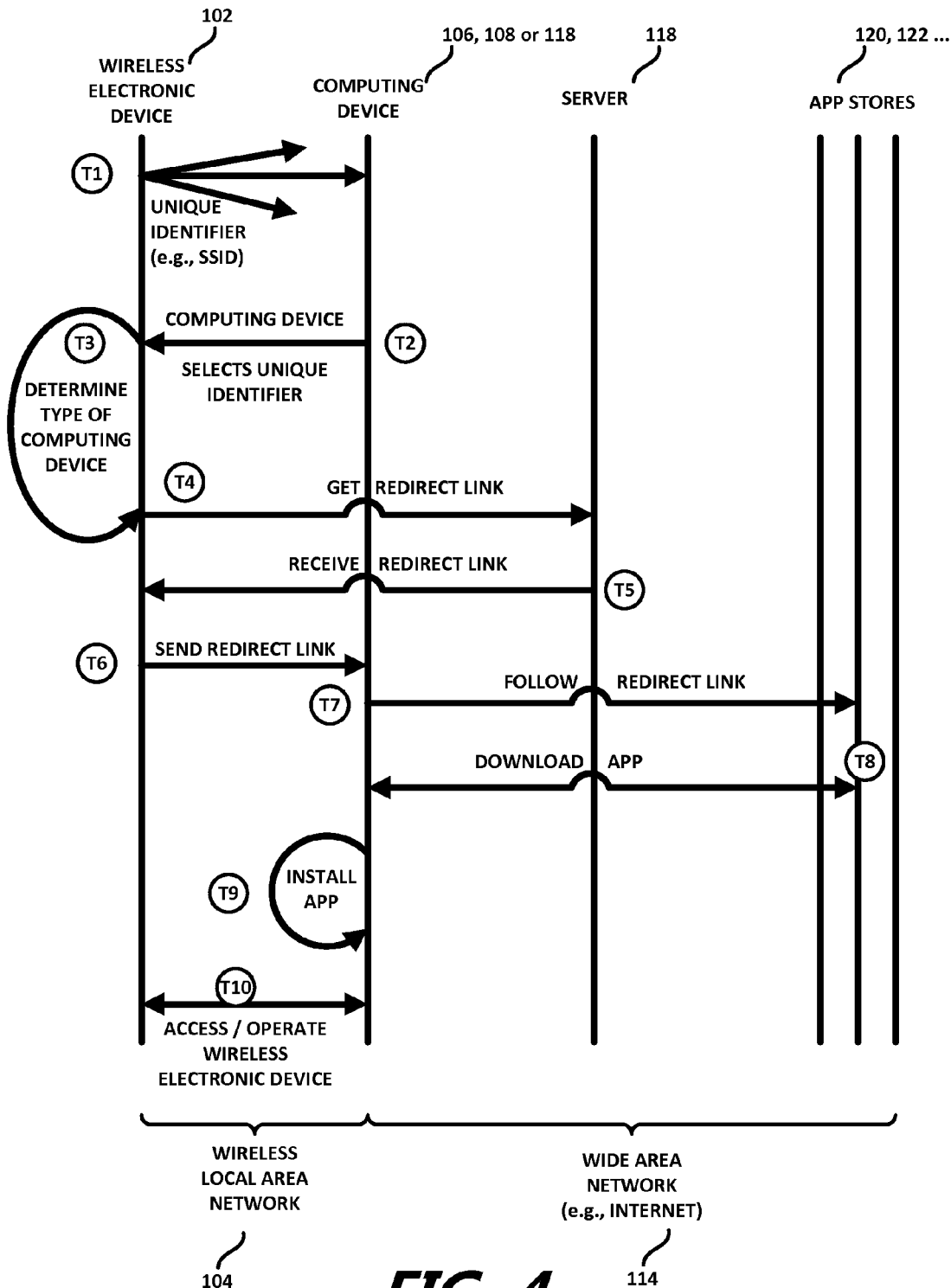
FIG. 4 is a diagram illustrating further aspects of one embodiment.

FIG. 4 is a diagram illustrating further aspects of one embodiment. As shown, the wireless electronic device 102, the computing device 106, 108 or 116, the server 118 and the App stores 120, 122 are shown along the top of the diagram and the time sequence of messages exchanged between these devices or services is shown with earlier messages or actions being closer to the top of the page than comparatively later messages or actions. Arrows start from the message or action originator and end at the message or action recipient. As shown at T1, the wireless electronic device 102 may broadcast a message, over a computer network such as the LAN 104, the message comprising a unique identifier, such as an SSID, for example. Having received the unique identifier, the computing device 106, 108 or 116 may select the SSID at T2 and send a message to the wireless electronic device 102, indicating that the computing device 106, 108 or 116 wishes to enter into communicate therewith. This message enables the wireless electronic device 102 to determine the type (e.g., iOS, Android, Microsoft Windows or the like) of the computing device 106, 108 or 116, as suggested at T3. Having determined the type of the computing device 106, 108, 116, the wireless electronic device 102 may obtain a redirect link from a server such as shown at 118 in FIG. 1, over the LAN 104 and/or the WAN 114, as suggested at T4. Alternatively, the wireless electronic device 102 may already have pre-fetched the redirect link or the redirect link may have been pre-stored therein. At T5, the server 118 may return the redirect link to the wireless electronic device 102 which may, as shown at T6, send the redirect link to the computing device 106, 108 or 116. The computing device 106, 108 or 116 may then follow the redirect link at T7 and access and download an app that is appropriate to its type of computing device, as suggested at T8. The computing device 106, 108 or 116 may then install the App as shown at T9. The computing device 106, 108 or 116, running the installed App, may now access and operate the wireless electronic device 102, as shown at 102. As shown, these interactions may be configured so as to minimize or avoid entirely, required user interactions. In this manner, a streamlined on-boarding process may be carried out, which may be as transparent to the end user as is desired. By providing a guided path (or wholly automated path that is opaque to the user), the user is spared any confusion as to which App Store to select and which App to select at the App store, in order to successfully use his or her new wireless electronic device 102 for the first time.

One embodiment is a wireless electronic device comprising a processor as shown at 110 in FIG. 1 a communication interface 124 and memory 112, coupled to the processor 110. The memory 112 may be configured to store instructions which, when executed by the processor, cause the wireless electronic device carry out the methods and functionality described and shown herein. In particular, according to one embodiment, the memory 112 may be configured to store instructions to send, over the communication interface 124, a unique identifier over a wireless LAN such as shown at 104. Instructions may also be stored to receive a communication from a computing device 106, 108 or 116 having selected the unique identifier and seeking to connect to the electronic device 102. Instructions may be stored in memory 112 that cause the wireless electronic device 102, responsive to having received the communication from the computing device, to determine at least the type of the computing device 106, 108, 116 and to redirect the computing device 106, 108, 116 to a location on computer network (including WAN 114, for example) where an application (an "App") configured to interface with the wireless electronic device 102 and suitable for the determined type of computing device 106, 108, 116 is available for download to the computing device 106, 108, 116.

According to one embodiment, the unique identifier may comprise a service set identifier (SSID). The memory 112 may be further configured to store instructions configured to cause the wireless electronic device 102 to determine a state of the computing device 106, 108, 116 and to redirect the computing device 106, 108, 116 only when the computing device is in a first state. In one embodiment, that first state is a state in which computing device 106, 108, 116 has not previously installed the application. The memory 112 may further store instructions configured to cause the wireless electronic device 102 to determine which features of the wireless electronic device have been used and to message the computing device 106, 108 or 116 regarding features of the wireless computing device that have not been used yet or that may have been under-utilized or alternatively still, new features of the wireless electronic device 102 that may have just been activated after an update, for example.

According to one embodiment, the type of computing device may be at least partly determined based upon the operating system of the computing device 106, 108, 116. Memory 112 may be further configured to store instructions configured to cause the wireless electronic device 102 to determine the type of the computing device and redirect the computing device as part of an on-boarding process. According to one embodiment, the memory 112 may further store instructions configured to cause the computing device 106, 108, 116 to implement a captive portal as part of redirecting the computing device 106, 108, 116. The captive portal may, but need not be displayed to the user. According to one embodiment, the location on the WAN 114 to which the computing device 106, 108, 116 is redirected may be a location within an online application store where the application is available for download. Lastly, memory 112 may store instructions configured to cause the wireless electronic device 102 to download the application from the location on the WAN 114 and to install the downloaded application onto the computing device 106, 108, 116, to thereby enable the downloaded application to run on the computing device 106, 108, 116, the on-boarding process to complete and to enable the user to make full use of the wireless electronic device 102.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A system, comprising:
a wireless electronic device configured to broadcast a unique identifier over a wireless local area network; and
a computing device, the computing device being coupled to the wireless local area network and configured to receive and select the broadcasted unique identifier to enter into communication with the wireless electronic device over the wireless local area network;
wherein the wireless electronic device is further configured to:
receive a communication from the computing device and, responsive thereto, determine a type of the computing device; and
redirect the computing device to a location on a wide area network where an application configured to enable the computing device to interface with the wireless electronic device and suitable for the determined type of computing device is available for download to the computing device; and
wherein the computing device is further configured to:
present, on a user interface, the application for download from the location on the wide area network; and
in response to a download request from the user interface, download and install the application to enable the computing device to operate the wireless electronic device.

2. A method of on-boarding a wireless electronic device, comprising:
broadcasting, by the wireless electronic device, a unique identifier over a wireless local area network;
receiving a communication from a computing device having selected the unique identifier and seeking to connect to the wireless electronic device;
responsive to having received the communication from the computing device, determining a type of the computing device; and
redirecting the computing device to a location on a wide area network where an application configured to interface with the wireless electronic device and suitable for the determined type of computing device is available for download to the computing device.

3. The method of claim 2, wherein the unique identifier comprises a service set identifier (SSID).

4. The method of claim 2, further comprising:
determining a state of the computing device; and
redirecting only when the computing device is in a state in which the computing device has not previously installed the application.

5. The method of claim 2, further comprising:
determining which features of the wireless electronic device have been used; and
messaging the computing device regarding features of the wireless electronic device that have not been used yet.

6. The method of claim 2, wherein the type of the computing device is at least partly determined based upon an operating system of the computing device.

7. The method of claim 2, wherein redirecting comprises implementing a captive portal on the computing device.

8. The method of claim 7, wherein the captive portal is not displayed on a display of the computing device and is transparent to a user thereof.

9. The method of claim 2, wherein the location on the wide area network is a location within an online application store where the application is available for download.

10. The method of claim 2, further comprising:
downloading the application from the location on the wide area network; and
installing the downloaded application onto the computing device.

11. The method of claim 2, wherein the wireless electronic device comprises a wireless data storage device.

12. A wireless electronic device, comprising:
a processor;
a communication interface; and
memory, coupled to the processor, configured to store instructions which, when executed by the processor, cause the wireless electronic device to:
broadcast, over the communication interface, a unique identifier over a wireless local area network;
receive a communication from a computing device having selected the unique identifier and seeking to connect to the wireless electronic device;
responsive to having received the communication from the computing device, determine a type of the computing device; and
redirect the computing device to a location on a wide area network where an application configured to interface with the wireless electronic device and suitable for the determined type of computing device is available for download to the computing device.

13. The wireless electronic device of claim 12, wherein the unique identifier comprises a service set identifier (SSID).

14. The wireless electronic device of claim 12, wherein the memory is further configured to store instructions configured to cause the wireless electronic device to:
determine a state of the computing device; and
redirect the computing device only when the computing device is in a first state.

15. The wireless electronic device of claim 14, wherein the first state is a state in which the computing device has not previously installed the application.

16. The wireless electronic device of claim 12, wherein the memory is further configured to store instructions configured to cause the wireless electronic device to:
determine which features of the wireless electronic device have been used; and
message the computing device regarding features of the wireless electronic device that have not been used yet.

17. The wireless electronic device of claim 12, wherein the type of the computing device is at least partly determined based upon an operating system of the computing device.

18. The wireless electronic device of claim 12, wherein the memory is further configured to store instructions configured to cause the wireless electronic device to implement a captive portal as part of redirecting the computing device.

19. The wireless electronic device of claim 18, wherein the memory is further configured to store instructions configured to cause the wireless electronic device to not cause the captive portal to be displayed on a display of the computing device and to be transparent to a user thereof.

20. The wireless electronic device of claim 12, wherein the location on the wide area network is a location within an online application store where the application is available for download.

21. The wireless electronic device of claim 12, wherein the memory is further configured to store instructions configured to cause the wireless electronic device to:
   download the application from the location on the wide area network; and
   install the downloaded application onto the computing device.

* * * * *